(12) United States Patent
Yan et al.

(10) Patent No.: US 10,096,078 B2
(45) Date of Patent: Oct. 9, 2018

(54) MULTI GPU INTERCONNECT TECHNIQUES

(71) Applicant: Nvidia Corporation, Santa Clara, CA (US)

(72) Inventors: Ming Yan, Shenzhen (CN); Chao Chen, Shenzhen (CN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/966,262

(22) Filed: Aug. 13, 2013

(65) Prior Publication Data

US 2015/0049094 A1   Feb. 19, 2015

(51) Int. Cl.
*G06T 1/60*   (2006.01)
*G06T 1/20*   (2006.01)

(52) U.S. Cl.
CPC ...................................... *G06T 1/20* (2013.01)

(58) Field of Classification Search
CPC ................ G06T 1/20; G06T 1/00; G06T 1/60
USPC ................................................ 345/502–506
See application file for complete search history.

(56) References Cited

U.S. PATENT DOCUMENTS

| 2005/0050230 | A1* | 3/2005 | Vo | G06F 13/4022 |
| | | | | 710/1 |
| 2007/0139422 | A1* | 6/2007 | Kong et al. | 345/502 |
| 2009/0079747 | A1* | 3/2009 | Johnson et al. | 345/506 |
| 2009/0167771 | A1* | 7/2009 | Franko et al. | 345/502 |
| 2009/0248941 | A1* | 10/2009 | Morein | G06F 13/4265 |
| | | | | 710/308 |
| 2014/0135067 | A1* | 5/2014 | Liu | H04W 88/08 |
| | | | | 455/561 |
| 2014/0297972 | A1* | 10/2014 | Ikeda | G06F 12/023 |
| | | | | 711/153 |

* cited by examiner

*Primary Examiner* — Ke Xiao
*Assistant Examiner* — Kim-Thanh T Tran

(57) ABSTRACT

A graphics processing subsystem includes one or more memory devices and two or more graphics processing units (GPU). The graphics processing units each include a memory interface. A first sub-set of the memory interface of the first graphics processing unit communicatively couples the first graphics processing unit to the first memory device. A first sub-set of the memory interface of the second graphics processing unit is connected to a second sub-set of the memory interface of the first graphics processing unit.

14 Claims, 3 Drawing Sheets

MULTI GPU INTERCONNECT TECHNIQUES

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, game consoles, servers, and the like have facilitated increased productivity and reduced costs in communicating and analyzing data in most areas of entertainment, education, business, and science. One common aspect of conventional computing devices is the graphics processing unit. The graphics processing unit is used to accelerate graphics intensive processing such as two-dimensional and three-dimension image rendering.

Conventional computing systems may employ multiple graphics processing units on several graphics cards working side-by-side. The graphics cards are typically communicatively coupled together by a specialized bus, such as the scalable link interface (SLI), cross-fire interface, or the like. However, there is a continuing need for improved techniques for communicatively coupling a plurality of graphics processing units in a computing device.

SUMMARY OF THE INVENTION

The present technology may best be understood by referring to the following description and accompanying drawings that are used to illustrate embodiments of the present technology directed toward multi graphics processing unit (GPU) interconnect techniques.

In one embodiment, the device includes a plurality of GPUs, each including a memory interface. A sub-set of communication links of the memory interface of a first GPU is connected to a corresponding sub-set of communication links of the memory interface of the second GPU. A sub-set of communication links of the memory interface of an Nth GPU is connected to a corresponding sub-set of communication links of the memory interface of an (N−1)th GPU. Corresponding sub-sets of communication links of the memory interface of the second through the (N−1)th GPU are connected to corresponding sub-sets of communication links of the memory interfaces of respective previous and next GPUs.

The plurality of GPUs may be connected to each other by the respective sub-set of communication links in any of a plurality of topologies, such as a daisy chain or a ring. In a ring, for instance, another sub-set of communication links of the memory interface of the Nth GPU is connected to another corresponding sub-set of communication links of the memory interface of the first GPU.

The device may also include one or more memory devices. In such embodiments, a given sub-set of communication links of the memory interfaces of each of one or more GPUs respectively communicatively couple the one or more GPUs to the one or more memory devices. In such embodiments, the combined width of sub-set of communication links of the memory interface connecting a given GPU to another GPU and the sub-set of communication links coupling the given GPU to one or more memory devices is equal to the total width of the communication links of memory interface of the given GPU.

The memory interfaces of the GPUs were originally intended to communicatively couple the GPU to one or more memory devices. However, a subset of the communication links of the memory interface, in accordance with embodiments of the present technology, is also advantageously utilized to connect the GPUs together, thereby eliminating the need for a dedicated inter GPU communication channel such as an SLI or CrossFire bus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
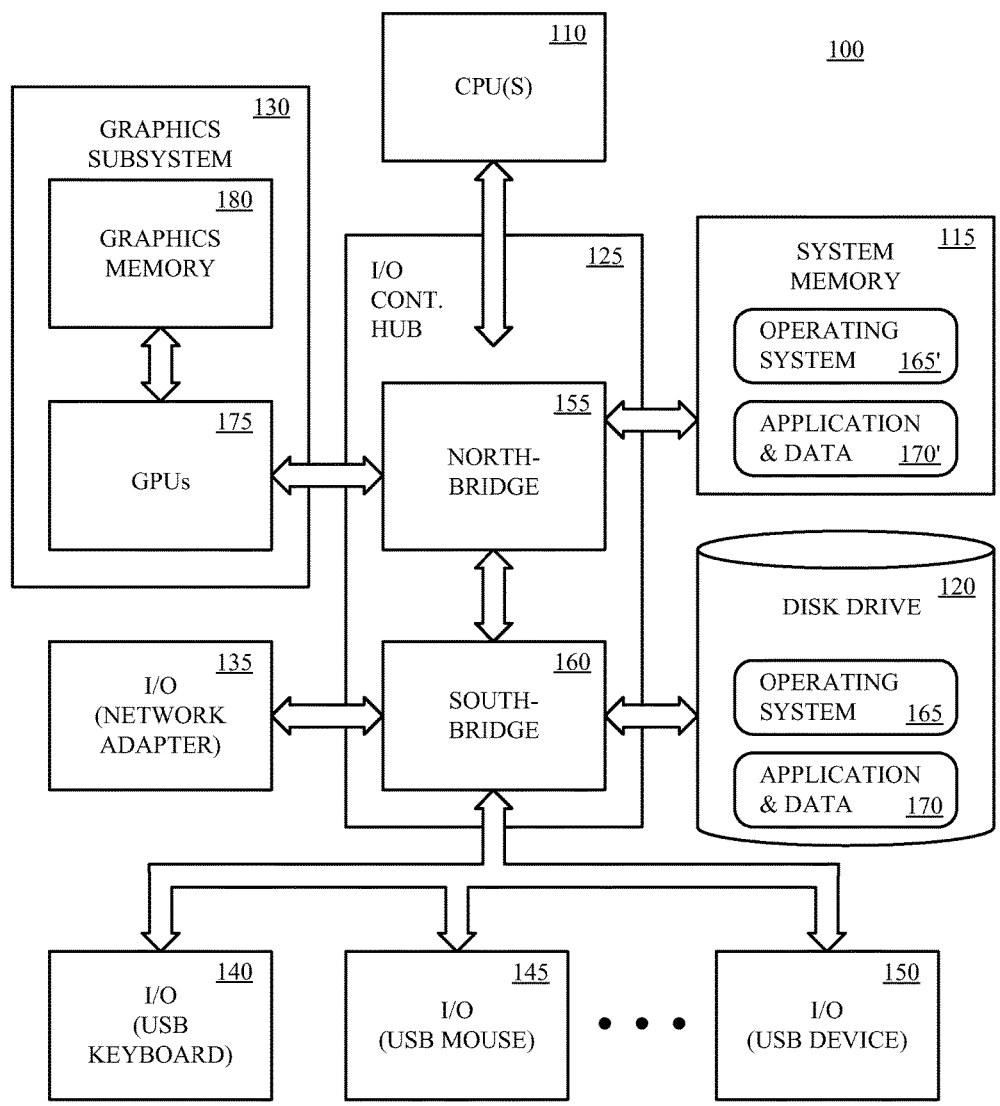
FIG. 1 shows a block diagram of an exemplary computing device implementing embodiments of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. In addition, the use of labels including first, second and the like are not intended to specify a particular order. Such labels are merely used to differentiate multiple instances of the same element. It is also to be understood that the phraseology and terminology used herein is for the purpose of description and should not be regarded as limiting.

Referring to FIG. 1, an exemplary computing device implementing embodiments of the present technology is shown. The computing device 100 may be a desktop personal computer (PC), laptop PC, tablet PC, netbook, smart phone, game console, server, or the like. The computing device 100 includes one or more processors (e.g., CPU) 110, one or more computing device-readable media 115, 120, an input/output (I/O) controller hub 125, a graphics processing subsystem 130, and one or more input/output (I/O) devices 135-150. The one or more I/O device 135-150, the graphics processing subsystem 130, and the one or more computing device-readable media 115, 120 are coupled to the processor 110 by the I/O controller hub 125 and one or more buses.

The I/O controller hub 125 acts as a simple input/output hub for communicating data and instructions between the processor 110 and the computing device-readable media 115, 120, graphics processing subsystem 130 and I/O devices 135, 140, 145, 150. In one implementation, the I/O controller hub 125 includes a northbridge 155 and southbridge 160 chipset. The northbridge 155 provides for communication with the processor 110 and interaction with the system memory 115. The southbridge 160 provides for input/output functions.

The I/O device 135, 140, 145, 150 may include a network adapter (e.g., Ethernet card), CD drive, DVD drive and/or the like, and peripherals such as a monitor, a keyboard, a pointing device, a speaker, a printer, and/or the like.

The computing device-readable media 115, 120 may be characterized as primary memory and secondary memory. Generally, the secondary memory, such as a magnetic and/or optical storage, provides for non-volatile storage of computer-readable instructions and data for use by the computing device 100. For instance, the disk drive 120 may store the operating system (OS) 165 and applications and data 170. The primary memory, such as the system memory 115, provides for volatile storage of computer-readable instructions and data for use by the computing device 100. For instance, the system memory 115 may temporarily store a portion of the operating system 165' and a portion of one or more applications and associated data 170' that are currently used by the CPU 110 and the like.

It is appreciated that the computing device 100 may further include additional subsystems, peripherals, devices and/or the like. In addition, the computing device need not include one or more of the above described subsystems, peripherals, devices and/or the like. Likewise, the function of one or more above described subsystems, peripheral devices may be integrated into one or more other subsystems, peripherals, devices and/or the like. Similarly, the functions of one or more subsystems, peripheral, devices may be further divided and implemented in separate subsystems, peripherals, devices and/or the like. For example, the function of the north bridge 155 may be integrated into the central processing unit 110. Furthermore, the one or more CPUs 110, system memory 115, disk drive 120, I/O controller hub 125 and I/O devices 135-150 and there operation are well known by those skilled in the art and therefore will not be discussed further.

The graphics processing subsystem 130, in accordance with embodiments of the present technology, includes a plurality of graphics processing units (GPUs) 175. The graphics processing subsystem 130 may also include computing device-readable media, such as dedicated graphics memory 180. Alternatively or in addition, the graphics subsystem may utilize other computing device-readable media, such as the system memory 115 and/or disk drive 120. The graphics processing subsystem 130 and its operation, in accordance with embodiments of the present technology, is further described with reference to FIGS. 2 and 3.

Figure 2:
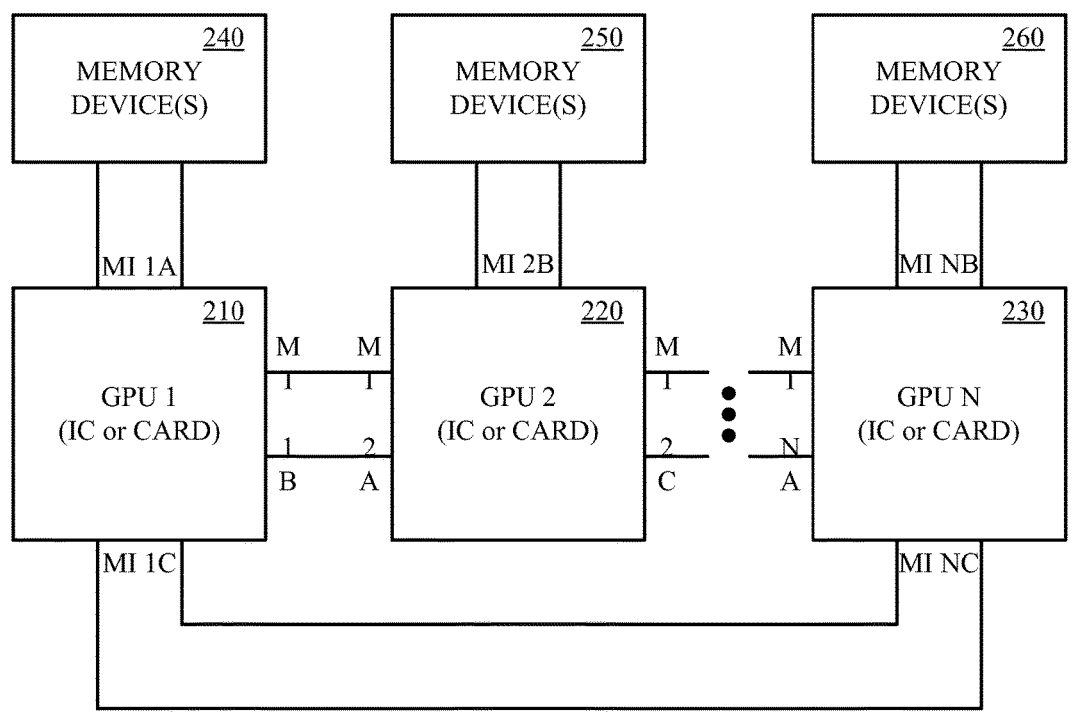
FIG. 2 shows a block diagram of a graphics processing subsystem, in accordance with one embodiment of the present technology.

Referring now to FIG. 2, the graphics processing subsystem, in accordance with one embodiment of the present technology, is shown. The graphics processing subsystem includes a plurality of GPUs 210-230 communicatively coupled together. In one embodiment, each GPU may be a monolithic integrated circuit (IC) including one or more graphics processing cores. In another embodiment, each GPU may be a graphics card including one or more GPU ICs, wherein each GPU IC includes one or more graphics processing cores. The plurality of GPUs may each be the same model, or the GPUs may be comprised of a plurality of different GPU models with the same size or different size memory interfaces.

Each GPU includes a memory interface (MI) intended to communicatively couple the GPU to one or more memory devices. The memory interface may be any conventional memory interface, such as DDR3, GDDR5 or the like, or any future memory interface. One or more sub-sets of the communication links of the memory interface, in accordance with embodiments of the present technology, are instead used to communicatively couple the plurality of GPUs 210-230 together, and one or more sub-sets are used to communicatively couple one or more of the GPUs to one or more memory devices 240-260. The sub-sets of the memory interface between the GPUs 210-230, and between the GPUs 210-230 and the memory devices 240-260 may be any ratio of the total width of the memory interface. In addition, one or more buses, such as a peripheral component interface express (PCI-E) bus, can communicatively couple the plurality of GPUs 210-230 of the graphics processing subsystem to the I/O controller hub.

When N GPUs are communicatively coupled together, a first sub-set of the communication links of the memory interface (MI 1A) of a first GPU 210 is connected to a corresponding first sub-set of the memory interface (MI 2A) of a second GPU 210, and a sub-set of the memory interface of an Nth GPU is connected to a corresponding sub-set of communication links of the memory interface of an (N−1)th GPU. Corresponding sub-sets of the communication links of the memory interface of the second through (N−1)th GPU are connected together so that each given GPU is connected to the respective adjacent GPUs. The sub-sets of the memory interfaces utilized to connect the N GPUs together may communicatively couple the GPUs in any desired topology, such as series, ring or the like. In addition, the sub-set of the memory interface of a given GPU not utilized to connect the given GPU to another GPU may be utilized to communicatively couple the plurality of GPUs to one or more memory devices.

In one implementation, the N GPUs may be connected to each other in a ring topography. If each GPU includes a 256-bit wide memory interface, such as a frame buffer interface, 128-bits may be utilized to couple each GPU 220 to a respective set of one or more memory devices 250. In addition, 64-bits of the memory interface may be utilized to couple each GPU 220 to the previous GPU 210 in the ring topology and the other 64-bit may be utilized to couple the GPU 220 to the next GPU 230 in the ring topology. The above implementation in a ring topology is only one possible implementation. Numerous different topologies and many different widths of the sub-sets of communication links connecting the GPUs together and coupling the GPUs to respective memory devices are possible.

The ratio between the width of the sub-sets of communication links used to connect the GPUs together and the width of sub-sets of the memory interface used to communicatively couple the GPUs to the one or more memory devices may be based upon the calculation and application performed by the GPUs 210-230.

Figure 3:
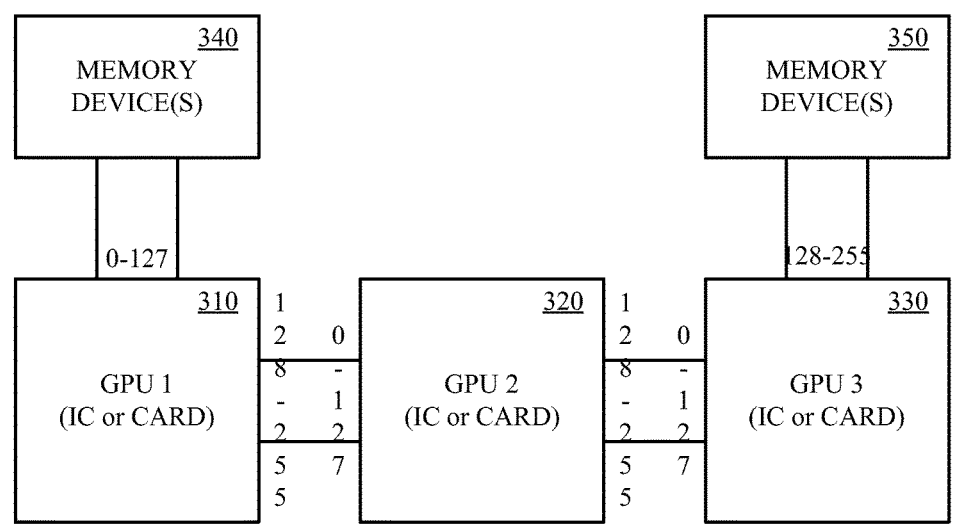
FIG. 3 shows a block diagram of a graphics processing subsystem, in accordance with an exemplary implementation of the present technology.

Referring now to FIG. 3, the graphics processing subsystem, in accordance with an exemplary implementation of the present technology, is shown. As illustrated, each GPU 310-330 includes 256 communication links intended to communicatively couple the respective GPU to a frame buffer. In accordance with embodiments of the present technology, a subset of the communication links of the frame buffer is instead utilized to communicatively couple each of the GPUs to another of the plurality of GPUs in a daisy chain topology. In one implementation, for instance, 128-bits of a 256-bit wide frame buffer interface of a first GPU 310 is utilized to couple the first GPU 310 to a corresponding 128-bit wide portion of the memory interface of a second GPU 320. Similarly, a second 128-bit wide portion of the memory interface of the second GPU 320 is utilized to couple the second GPU 320 to a corresponding 128 bit wide portion of the memory interface of a third GPU 330. A second 128 bit wide portion of the memory interfaces of the first and third GPUs 310, 330 are utilized to communicatively couple the first and third GPUs 310, 330 to corresponding one or more memory device 340, 350.

In accordance with embodiments of the present technology, there is no need for other buses or bus bridges between the GPUs other than the connections provided by the sub-set of communication links of the memory interface.

A plurality of GPUs connected in accordance with embodiments of the present technology, can advantageously share their memory with each other without substantial performance loss. Instead, performance can be substantially maintained because the data transfer rate of the interconnection between the GPUs is relatively high compared to other interconnection techniques. Although each GPU uses a sub-set of the memory interface for interconnection to other GPUs, the GPUs can share their respective remaining memory interface bandwidth with each other. Accordingly, the total data transfer rate performance of the memory interface bandwidth should be approximately equal or near to the bandwidth of the single GPUs memory interface. In contrast, for other conventional multi GPU connection techniques, such as SLI or CrossFire connections, the GPUs are limited to using their own memory. Therefore, in the conventional techniques, the data transfer rate is the same as for a single GPU.

Embodiments of the present technology also advantageously permit the GPUs to share memory, which may enable cost savings by reducing the number of memory chips utilized in various configurations. In contrast, conventional techniques using SLI, CrossFire or the like to couple multiple GPUs, require each GPU to have its own memory, which may limit the ability to reduce memory costs.

Embodiments of the present technology advantageously provide a relatively high speed data transfer rate and enable every GPU to access all the memory in the graphics processing subsystem however the memory chips are connected to the GPUs. Therefore, the parallel GPU processing efficiency will be relatively high, especially compared with SLI and CrossFire connection techniques. It is also to be appreciated that various functions of the GPUs can be provided by any GPU in the topology.

Finally, the host computing device can advantageously treat the graphics processing subsystem as a single graphics device. Accordingly, the computing device does not need drivers and applications to optimize for the parallel processing of the plurality of GPUs communicatively coupled in accordance with embodiments of the present technology.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A device comprising:
    a first memory device;
    a first graphics processing unit including a memory interface, wherein a first sub-set of the bit width of communication links of the memory interface of the first graphics processing unit communicatively couples the first graphics processing unit to the first memory device; and
    a second graphics processing unit including a memory interface, wherein a first sub-set of the bit width of communication links of the memory interface of the second graphics processing unit is connected to a second sub-set of the bit width of the communication links of the memory interface of the first graphics processing unit, wherein the combined bit width of first and second sub-set of the bit width of communication links of the memory interface of the first graphics processing unit is equal to the total bit width of the communication links of the memory interface of the first graphics processing unit.

2. The device of claim 1, further comprising a second memory device, wherein a second sub-set of the bit width of the communication links of the memory interface of the second graphics processing unit communicatively couples the second graphics processing unit to the second memory device.

3. The device of claim 1, further comprising a third graphics processing unit including a memory interface, wherein a first sub-set of the bit width of communication links of the memory interface of the third graphics processing unit is connected to a second sub-set of the bit width of the communication links of the memory interface of the second graphics processing unit.

4. The device of claim 3, further comprising a second memory device, wherein a second sub-set of the bit width of the communication links of the memory interface of the third graphics processing unit communicatively couples the third graphics processing unit to the second memory device.

5. The device of claim 1, wherein the memory interfaces of the first and second graphics processing units comprise frame buffer interfaces.

6. The device of claim 1, wherein the first and second graphics processing unit are different graphics processing units.

7. A device comprising:
a plurality of graphics processing units (GPU) each including a memory interface, wherein;
a sub-set of the bit width of the communication links of the memory interface of a first GPU is connected to a corresponding sub-set of the bit width of the communication links of the memory interface of the second GPU;
a sub-set of the bit width of the communication links of the memory interface of an Nth GPU is connected to a corresponding sub-set of the bit width of the communication links of the memory interface of an (N−1)th GPU;
corresponding sub-sets of the bit width of the communication links of the memory interface of the second through (N−1)th GPU are connected to corresponding sub-sets of the bit width of the communication links of the memory interfaces of respective previous and next GPUs; and
another sub-set of the bit width of the communication links of the memory interface of at least one of the plurality of GPUs is connected to a respective memory device, wherein the combined bit width of sub-sets of the communication links of the at least one of the plurality of GPUs is equal to the total bit width of the communication links of the memory interface of the at least one of the plurality of GPUs.

8. The device of claim 7, wherein another sub-set of the bit width of the communication links of the memory interface of the Nth GPU is connected to another corresponding sub-set of the bit width of the communication links of the memory interface of the first GPU.

9. The device of claim 7, wherein the plurality of GPUs are all the same GPU.

10. The device of claim 7, wherein the plurality of GPUs include two or more different GPUs.

11. The device of claim 7, wherein at least one of the plurality of GPUs is communicatively coupled to one or more central processing units of the device by a peripheral component interface express (PCI-E) bus.

12. The device of claim 7, wherein each of the plurality of GPUs comprises an integrated circuit (IC) including one or more graphics processing cores.

13. The device of claim 7, wherein each of the plurality of GPUs comprises a graphics card including one or more GPU integrated circuits (IC), wherein each GPU IC includes one or more graphics processing cores.

14. The device of claim 7, wherein the memory interfaces comprise a frame buffer interface.

* * * * *